United States Patent [19]

Jung et al.

[11] Patent Number: 4,639,770

[45] Date of Patent: Jan. 27, 1987

[54] METHOD AND CIRCUIT ARRANGEMENT FOR SIMULATING A MULTI-COLORED REPRODUCTION ON A COLOR MONITOR

[75] Inventors: Eggert Jung, Schoenberg; Siegfried Klopsch, Probsteierhagen, both of Fed. Rep. of Germany

[73] Assignee: Dr. Ing. Rudolf Hell GmbH, Fed. Rep. of Germany

[21] Appl. No.: 683,803

[22] Filed: Dec. 19, 1984

[30] Foreign Application Priority Data

Dec. 24, 1983 [DE] Fed. Rep. of Germany ....... 3347049

[51] Int. Cl.$^4$ .............................................. H04N 1/46
[52] U.S. Cl. ........................................ 358/76; 358/78; 358/80
[58] Field of Search ........................ 358/75, 76, 78, 80

[56] References Cited

U.S. PATENT DOCUMENTS

| | | | |
|---|---|---|---|
| 3,128,333 | 4/1964 | Loughlin | 178/5.2 |
| 3,885,244 | 5/1975 | Keller | 358/80 |
| 3,972,066 | 7/1976 | Sebi et al. | 358/76 |
| 4,075,662 | 2/1978 | Gall | 358/280 |
| 4,285,009 | 8/1981 | Klopsch | 358/76 |
| 4,328,399 | 5/1982 | Perks et al. | 179/90 K |
| 4,328,515 | 5/1982 | Wellendorf | 358/80 |
| 4,393,399 | 7/1983 | Gast et al. | 358/80 |
| 4,511,989 | 4/1985 | Sokamoto | 358/80 X |
| 4,561,016 | 12/1985 | Jung et al. | 358/76 |

FOREIGN PATENT DOCUMENTS 1407487 9/1975 United Kingdom .

*Primary Examiner*—James J. Groody
*Assistant Examiner*—John C. Fox
*Attorney, Agent, or Firm*—Hill, Van Santen, Steadman & Simpson

[57] ABSTRACT

A method and apparatus for isochromatic simulation of a multi-colored reproduction on a color monitor. Before simulation, colors are generated on the color monitor and are matched to corner colors of a printed color chart or the like by measuring or visual comparison. The color values required for the chromatically coinciding generation of the corner colors on the color monitor are measured and allocated to color separation values of the corner colors. The color values required for generating intermediate colors are calculated upon consideration of the printing process of the multi-colored reproduction and are allocated to the corresponding color separation values of the intermediate colors. During the simulation, the color separation values of the multi-colored reproduction are output, modified according to a gradation curve, and transformed into the color values for driving the color monitor in accordance with the previously identified allocations.

17 Claims, 3 Drawing Figures

METHOD AND CIRCUIT ARRANGEMENT FOR SIMULATING A MULTI-COLORED REPRODUCTION ON A COLOR MONITOR

BACKGROUND OF THE INVENTION

The invention relates to the field of electronic reproduction technology for multi-colored printing and relates to a method of simulating a multi-colored reproduction on a color monitor in order to execute a color evaluation and color correction of the anticipated printing result before the actual printing process. The invention also relates to a circuit arrangement referred to as a color viewing apparatus.

In the electronic reproduction of color originals, three primary color value signals, which are a measure for the color components red, green and blue of the scanned picture elements, are acquired in a color scanner by point-by-point and line-by-line trichromatic scanning of the original and opto-electronic conversion of the scan light. A color correction computer corrects the measured color value signals and generates four color separation signals for the color separations "yellow", "magenta", "cyan", and "black" in the case of four-color printing. During printing, the color separation signals indicate the required quantities of yellow, magenta, cyan, and black ink. The printing forms for printing are produced from the color-corrected separation signals. The superimposed printing of the printing forms inked with the four inks then occurs on the impression paper in impression printing presses.

Color viewing apparatus wherein the anticipated printing result is simulated by simulating the printing process on a color monitor, are in use in order to monitor the anticipated printing result even before the production of the printing forms, and in order to correct if necessary. So-called color converters or print simulation computers are employed for printing simulation, these converting the color separation signals into drive signals for the color monitor upon consideration of the print parameters such that the color picture of the monitor conveys the same chromatic impression as the anticipated multi-color printing on the impression paper.

U.S. Pat. No. 3,128,333, incorporated herein by reference, discloses a color converter in which the color separation signals are converted into corresponding drive signals for the color monitor by an analog signal processing. The known color converter, however, has the disadvantage that a reproduction quality of a multi-color reproduction, that is only averaged over the entire color space, can be achieved in the representation of party colors on the color monitor.

SUMMARY OF THE INVENTION

It is an object of the invention to specify a method and a circuit arrangement for simulating a multi-color reproduction on a color monitor with which the farthest reaching chromatic coincidence between monitor color picture and later multi-color reproduction is achieved so that a high-grade and reliable statement regarding the expected reproduction quality is possible.

According to the invention, color signal values are prescribed, the colors corresponding to the prescribed color signal values generated on the color monitor. The generated monitor colors are matched to corner colors of a print color space by changing the color signal values so that the print corner colors have been printed under conditions of the multi-color reproduction. The color value triads r, g, b required for the chromatically coinciding generation of the corner colors on the color monitor are identified given consideration of a non-linear relationship between radiation density values of individual phosphors of the color monitor and the color values. For every corner color, the identified color value triad r, g, b is allocated to a corresponding triad Y*, M*, C* of color separation values of three chromatic color separations of the corner color. Color value triads r, g, b for intermediate colors of the print color space lying between the corner colors required for chromatically coinciding generation of the intermediate colors on the color monitor are respectively calculated from triads Y, M, C of the three chromatic color separations given consideration of the reproduction process for the multi-color reproduction. For every intermediate color, the calculated color value triad r, g, b is allocated to the corresponding triad Y, M, C of color separation values of the three chromatic color separations of the intermediate color. During simulation of the multi-colored reproduction, color separation values Y, M, C, K of the three chromatic color separations and of a black separation of the multi-colored reproduction are called in and are modified according to a reproduction gradation curve employed in the later to occur multi-color reproduction. The previously allocated color value triads r, g, b are output instead of color separation value triads Y', M', C' of the three chromatic color separations of the multicolored reproduction. The output color value triads r, g, b are combined with the modified color separation values K' of the black separation to form corrected color value triads r', g', b'. The corrected color value triads r', g', b' are converted into video drive values r'$_v$, g'$_v$, b'$_v$ for the color monitor.

DESCRIPTION OF THE PREFERRED EMBODIMENTS

Figure 1:
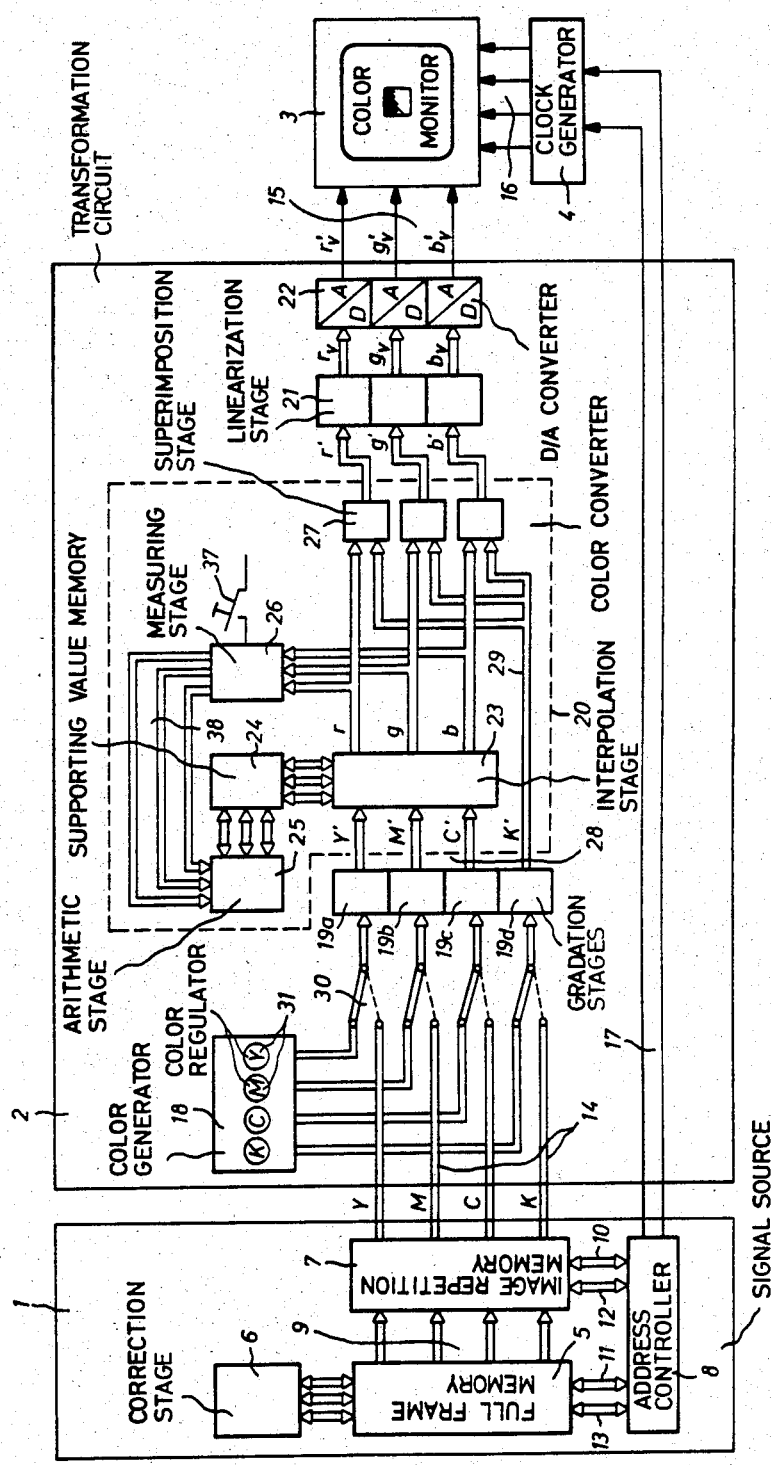
FIG. 1 is a schematic circuit arrangement for a color viewing apparatus.

FIG. 1 shows an illustrative embodiment of a circuit arrangement for simulating a multi-color reproduction on a color monitor for a color evaluation and color correction of an anticipated multi-color reproduction before a printing process. This is referred to below as a color viewing apparatus.

The color viewing apparatus is essentially composed of a signal source 1, of a transformation circuit 2, of a color monitor 3, and of a clock generator 4.

The signal source 1 generates digital color separation values Y, M, C, and K for the color separations "yellow" (Y), "magenta" (M), "cyan" (C) and "black" (K) of a color picture to be printed. The digital color separation values Y, M, C, and K are a measure for the required metered amounts of printing inks or for the size of the raster points, in percent. The digital color separation values have, for example, a word length of 8 bits, whereby "black" (100% raster point size) is allocated to the digital color separation value 0 and "white" (0% raster point size) is allocated to the digital color separation value 225. A total of 254 gray scale values are discriminated between "black" and "white".

The signal source 1 can contain an electronic color camera which generates measured color value signals R, G, and B by a video-wise, point-by-point and line-by-line scanning of the color picture to be printed or to be represented on the color monitor 3.

An adjustable color correction stage following the color camera converts the measured color value signals R, G, and B into the color separation signals Y, M, C, and K according to the laws of subtractive color mixing.

In the illustrative embodiment shown, the signal source 1 is composed of a full frame memory 5, of a correction stage 6, of an image repetition memory 7, and of an address controller 8. The digital color separation values Y, M, C, and K of a discrete image or of an already assembled printing page are deposited in the full frame memory 7. The color separation values Y, M, C, and K of a discrete image were generated, for example, in a color scanner. The combination of the color separation values of various discrete images to form the color separation values of a printing page occurs according to a lay-out plan, for example by an electronic page make-up in an image processing system of the German OS No. 21 61 038, corresponding to U.K. Pat. No. 1,407,487, incorporated herein by reference. The color separation values required for the representation of the color picture or of a trimmed picture on the color monitor 3 from, for example, 512×512 picture elements, are selected or calculated from the entire dataset of the full frame memory 5, and are loaded from there via the data busses 9 into the image repetition memory 7 which comprises a storage capacity for 512×512 color separation values corresponding to the number of picture elements. For the transmission of the color separation values, the address controller 8 calls the corresponding addresses in the full frame memory 5 and in the image repetition memory 7 via the address busses 10 and 11, and generates the corresponding read clocks on control busses 12 and 13.

For the representation of the color picture on the color monitor 3, the address controller 8 cyclically calls in the addresses of the image repetition memory 7 via the address bus 10. The addressed color separation values Y, M, C, and K are read out line-by-line and picture-element-by-picture-element within every line with the assistance of the read clock on the control bus 12, and are supplied via the data busses 14 to the transformation circuit 2. In the transformation circuit 2, the color separation values Y, M, C, and K are transformed into video drive signals $r'_v$, $g'_v$, and $b'_v$ for the color monitor 3 on lines 15 such that the color picture displayed on the color monitor 3 conveys the same chromatic impression as the color picture printed on the impression paper under production run conditions.

The point-by-point and line-by-line recording of the color picture on the color monitor 3 occurs, for example, according to the line interlace method with 50 fields/sec in order to produce a flicker-free image. Based on the technique standard in television, the clock generator 4 generates the horizontal and vertical deflection signals as well as the line start pulses and picture start pulses on lines 16. The address controller 8 in the signal source 1 supplies corresponding horizontal and vertical sync pulses via lines 17 to the clock generator 4, so that the monitor recording is synchronized with the read operation of the color separation values from the image repetition memory 7.

The operator can now evaluate the displayed color picture and, when necessary, undertake color corrections by changing the color separation values Y, M, C, and K with the assistance of the correction stage 6 in the full frame memory 5. The color separation values Y, M, C, and K modified in the full frame memory 5 are automatically transferred into the image repetition memory 7, so that the color-corrected picture respectively appears on the color monitor 3.

Each of the color separation values quadruplets Y, M, C, and K supplied by the signal source 1 represents a color printed on the impression paper, referred to below as print color, which arises by superimposed printing of different proportions of the yellow, magenta, cyan, and black colors, and by subtractive color mixing. Each print color can be identified by a triad of standardized color values $\overline{X}_D$, $\overline{Y}_D$, and $\overline{Z}_D$. The video drive values $r'_v$, $g'_v$, and $b'_v$ are a measure for the luminances of the individual phosphors "red", "green" and "blue" of the color monitor 3. Each triad of video drive values $r'_v$, $g'_v$, and $b'_v$ therefore represents a color formed on the color monitor 3 by additive color mixing of the components red, green, and blue, said color being referred to below as a monitor color. Every monitor color can likewise be identified by a triad of standardized color values $\overline{X}_M$, $\overline{Y}_M$, and $\overline{Z}_M$.

The transformation stage 2 is composed of a color generator 18, of gradation stages 19a–19d, of a color converter 20, of linearization stages 21, and of digital-to-analog converters 22. The color converter in turn comprises an interpolation stage 23, a supporting value memory 24, an arithmetic stage 25, a measuring stage 26, as well as super-imposition stages 27.

In the gradation stages 19a–19d, the color separation values Y, M, C, and K are corrected into color separation values Y', M', C', and K' according to equation (1), first according to gradation curves $f_1$:

$$Y',M',C',K'=f_1(Y,M,C,K). \quad (1)$$

The print gradation curves $f_1$, also referred to as print characteristics, take the parameters of the printing process, the impression paper, as well as the true inks into consideration. The gradation stages 19a–19d are designed, for example, as loadable memories (RAMs) in which the print gradation curves $f_1$ are stored.

The corrected color separation values Y', M', C', K' are forwarded to the color converter 20. In the color converter 20, the triad of color values (r', g', b') which is required for the representation of the isochromatic monitor color is generated for every quadruplet of corrected color separation values (Y',M',C',K') of a print color:

$$r',g',b'=f_2(Y',M',C',K'). \quad (2)$$

In the color converter 20, only the color separation values Y', M', C' corrected in the gradation stages 19a–19d are forwarded via the data busses 28 to the input of the interpolation stage 23, whereas the color separation values K' corrected in the gradation stage 19d for the black separation proceed via a data bus 29 directly to the superimposition stages 27. In accordance with equation (3), the interpolation stage 23 first outputs an allocated triad of color values r, g, and b required for isochromatic representation for every triad of corrected color separation values Y',M', and C', i.e. without taking the black separation into consideration:

$$r, g, b = f_3(Y', M', C'). \qquad (3)$$

In the illustrative embodiment shown, the allocation according to equation (3) is advantageously calculated only for a supporting point network of the print color space deposited in the supporting value memory 24, whereas all allocations required for recording the color picture on the color monitor 3 are identified by continuous interpolation in the interpolation stage 23. Alternatively, the allocations can also be calculated before the recording of the color picture, and are calculated for all theoretically possible colors of the print color space. In this case, the interpolation stage 23 is replaced by a correspondingly larger allocator memory.

The color values r, g, and b output from the interpolation stage 23 are joined in multiplicative fashion in the superimposition stages 27 to the color separation values K' for the black separation in order to obtain the corrected color values r', g', and b' at the output of the color converter 20.

$$r', g', b' = f_4(r, g, b) \qquad (4)$$

The corrected color values r', g', and b' represent the monitor colors to be generated on the color monitor 3, but which are not achieved due to the monitor characteristics, i.e. due to the non-linear relationships between the radiation density values of the individual phosphors and the video drive values. For this reason, linear relationships must be produced by a so-called monitor linearization between the radiation density value of the red phosphor and the video drive values r', the radiation density value of the green phosphor, and the video drive values g', as well as between the radiation density value of the blue phosphor and the video drive values b'.

This monitor linearization occurs since the color values r', g', and b' are converted into corresponding video drive values $r_v$, $g_v$, $b_v$ in the linearization stages 21 based on the measure of the monitor characteristics. The linearization stages 21 are designed, for example, as loadable memories (RAMs) in which the calculated video drive values $r_v$, $g_v$, $b_v$ are digitally stored. The stored digital video drive values $r_v$, $g_v$, $b_v$ are converted into the analog video drive values $r'_v$, $g'_v$, and $b'_v$ on the lines 15 in the digital-to-analog converters 22 which follow the linearization stages 21.

The monitor characteristics can be identified by a measurement of the radiation density at the color monitor as a function of the drive values. However, the monitor characteristics specified by the manufacturer of the color monitor can also be employed. In case the specified monitor characteristics are not exact enough, a correspondingly larger number of characteristic values could be identified by interpolation.

It is within the scope of the invention to already execute the calculation of the corrected color separation values Y', M', C', and K' in the gradation stages 19a–19d, the multiplicative combination of the color values r, g, and b with the corrected color separation values K' of the black separation and/or the linearization of the video drive values $r_v$, $g_v$, and $b_v$ before the representation of the color picture on the color monitor 3, and to take the corresponding calculations into consideration in the dataset of the supporting value memory 24 or of the allocator memory.

The function of the color viewing apparatus having been explained, the method for the identification of the color values r, g, and b required for a chromatically equivalent color picture representation dependent on the color separation values Y', M', and C' for the supporting location network or for the supporting value memory 24 in the color converter 20 before actual operation of the color viewing apparatus shall be discussed. In this phase of operations, a changeover 30 is situated in the illustrated position, so that the color generator 18 is connected to the gradation stages 19a–19d.

It is thus assumed that the gradation stages 19a–19d and the supporting value memory 24 function linearly at first, since the gradation stages 19a–19d as well as the supporting value memory 24 are loaded with linear functions.

In a first step, a calibration of the color monitor 3 to the brightest white (maximum picture white) and to the darkest black (maximum picture depth) is undertaken. It is guaranteed as a result of the white calibration that the color monitor 3 is illuminated with the brightest white when all color separation values Y=M=C=K=255 (rated white; 0% raster point size) or when the video drive values $r'_v$, $g'_v$, and $b'_v$ supplied to the color converter 20 are at maximum. For white calibration, the required color separation values are set in the color generator 18 with the assistance of the color regulators 31 "yellow", "magenta", "cyan", and "black", the monitor white thus generated being visually compared to a model original "picture white", for example to an art paper, and the operating parameters of the color monitor 3 being varied until the monitor white corresponds to the maximum picture white.

A following black calibration is intended to insure that the color monitor 3 generates the blackest black when the color separation values Y=M=C=K=0 (picture black; 100% raster point size) or when the video drive values $r'_v$, $g'_v$ and $b'_v$ are at a minimum. The black matching occurs analogously with a corresponding model original "black".

After the described calibration, those color value triads $r_n$, $g_n$, and $b_n$ which are required for isochromatic reproduction of the print colors $F_n$ or of the multi-color reproduction on the color monitor 3 are identified in a second step for the print colors $F_n$ of the supporting location network of the print color space. The second step divides into two sub-steps. In the first sub-step, the required color value triads $r_n$, $g_n$, and $b_n$ are measured for the print corner colors or for the color supporting or reference points of the print color space. In the second sub-step, the required color value triads $r_n$, $g_n$, and $b_n$ are calculated for all print intermediate colors of the reference point network within the print color space.

Figure 2:
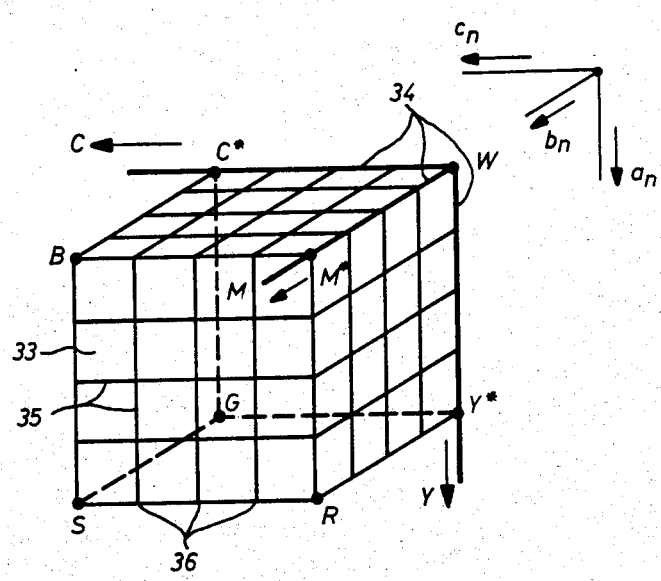
FIG. 2 is a graphic illustration of a printing color space.

For explanation, FIG. 2 shows an idealized, cub-shaped print color space 33 within the YMC color coordinate system 34 comprising the eight print corner colors. Specifically, these colors are the primary colors yellow (Y*), magenta (M*) and cyan (C*); the secondary colors red (Y*,M*), green (Y*,C*), and blue (M*,C*); and black and white. At the same time, a supporting or reference point network 35 into which the print color space 33 is sub-divided is shown having three supporting or reference points 36 on every edge of the cube. Of course, the number of supporting or reference points is substantially higher in the practical illustrative embodiment. Each supporting or reference point n of a print color $F_n$ is topically defined in the YMC color coordinate system 34 by a triad $Y'_n$, $M'_n$, and $C'_n$ of color separation values. One color value triad $r_n, g_n,$ and $b_n$ is allocated in accordance with equation (3) to every supporting or reference point n. The number of memory locations in the supporting or reference value memory 24 for the color value triads $r_n, b_n$, and $g_n$ to be allocated corresponds to the number of reference points n in the print color space 33. The memory locations of the supporting or reference value memory 24 are addressable by the addresses $0\text{-}a_m$, $0\text{-}b_m$ and $0\text{-}c_m$. Every memory location n has a corresponding supporting or reference point n allocated to it in such fashion that the address triad $a_n$, $b_n$, and $c_n$ with which the corresponding memory location n is addressable corresponds to the triad $Y'_n, M'_n$, and $C'_n$ of color separation values for the corresponding supporting or reference location n. Thus, for example, the memory location allocated to the corner color "white" is addressable by the addresses 0,0, and 0 and the memory location allocated to the corner color "black" is addressable by the addresses $a_m, b_m$, and $c_m$.

In the practical embodiment, a "three-dimensional" supporting or reference value memory is not employed for the deposit of three color values per memory location, but rather three memories separately addressable by the addresses $a_n, b_n$, and $c_n$ in which respectively one color value of the allocated color value triads is deposited are employed.

For the execution of the first sub-step, eight color separation value triads are first formed and are successively forwarded to the color monitor 3 in order to successively generate eight monitor colors. The color separation value triads are then iteratively varied such that the monitor colors are chromatically matched to the print corner colors, whereby the eight matched monitor colors represent the eight monitor corner colors.

In the illustrative embodiment described in FIG. 1, the color separation value triads are generated and modified with the assistance of the color regulators 31 in the color generator 18 and the color modifications are visually checked on the color monitor 3. For matching of the monitor colors to the print corner colors, the color regulators 31 for "yellow", "magenta", and "cyan" are actuated, whereas the color regulator 31 for "black" is set constant such that the corrected color separation value K' becomes zero, whereby no signal superimposition in the superimposition stages 27 occurs during the matching operation.

By actuating the color regulators 31 for the colors "yellow", "magenta", and "cyan", the respective luminances of the individual phosphors of the color monitor 3 complementary to the "colors" of the color regulators 31 are influenced, as proceeds from the following Table.

For the visual check of the color matching for example, real print corner colors are employed, i.e. colors that were printed with real inks on the impression paper under the conditions prevailing during the later impression printing. Such true print corner colors are available in the form of printed color fields which are also referred to as color scale, color atlas, or color chart.

The described relationships are compiled below in the form of a Table:

| Corner Colors | Color Regulators | Individual Phosphors Influenced |
|---|---|---|
| Yellow | cyan and magenta | red and green |
| Magenta | cyan and yellow | red and blue |
| Cyan | yellow and magenta | blue and green |

-continued

| Corner Colors | Color Regulators | Individual Phosphors Influenced |
|---|---|---|
| Red | cyan | red |
| Green | magenta | green |
| Blue | yellow | blue |
| White | cyan, magenta, yellow | red, green, and blue |
| Black | cyan, magenta, yellow | red, green, and blue |

The monitor corner colors are, for example, represented as color fields which cover only a small part of the picture screen surface in terms of area.

The color value triads $r_n, g_n$, and $b_n$ required for the isochromatic representation of the monitor corner colors are measured in the measuring stage 26, whereby every measuring operation between the individual representations is initiated by pressing a key 37. The measured color value triads $r_n, g_n$, and $b_n$ are transferred via data busses 38 and the arithmetic stage 25 into the supporting or reference value memory 24 and are deposited there under the addresses $a_n, b_n$, and $c_n$ allocated to the print corner colors $F_n$, as proceeds from the following Table:

Measured Color Addresses of

| Corner Color | Measured Color Value Triad of the Corner Colors | Addresses of the Supporting Value Memory |
|---|---|---|
| Yellow | $r_y, g_y, b_y$ | $0, c_m, b_m$ |
| Magenta | $r_m, g_m, b_m$ | $a_m, 0, c_m$ |
| Cyan | $r_c, g_c, b_c$ | $0, 0, c_m$ |
| Red | $r_r, g_r, b_r$ | $a_m, b_m, 0$ |
| Green | $r_g, g_g, b_g$ | $a_m, 0, c_m$ |
| Blue | $r_b, g_b, b_b$ | $0, b_m, c_m$ |
| White | $r_w, g_w, b_w$ | $0, 0, 0$ |
| Black | $r_s, g_s, b_s$ | $a_m, b_m, c_m$ |

For the visual comparison of monitor colors and print colors, a light box in the form of a light well is advantageously employed, this being placed on the picture screen with an opening. This opening has the size and shape of the picture screen surface, so that the picture screen is shielded from outside light. The opposite opening of the light box serves as a viewing aperture for the operator. The light box also comprises a partition between the openings and parallel thereto with a viewing aperture through which the operator observes the color field generated on the picture screen. The comparison color fields are applied to that side of the partition facing the viewing aperture, and are applied thereto in the region of the viewing aperture. The comparison color fields are advantageously illuminated by a standardized light source whose brightness is matched to the brightness of the picture screen. For this purpose, the standardized light source illuminates an art paper and the brightness of the standardized light source is set such that the light reflected from the art paper has the same brightness as the picture screen.

Alternatively to the above-described visual color comparison, a measuring comparison of color identification values, for example of standardized color values, can also be undertaken for matching the monitor corner colors to the print corner colors. In this case, the standardized color values $\overline{X}_D, \overline{Y}_D$, and $\overline{Z}_D$ of the print corner colors are measured in a color chart or the like with the assistance of a color measuring means. The standardized color values $\overline{X}_M, \overline{Y}_M$, and $\overline{Z}_M$ of the monitor colors on the picture screen of the color monitor 3 are then likewise measured with a color measuring means and the color separation value triads are varied with the assistance of the manually actuatable color regulators 31 of the color generator 18 until the standardized color values $\overline{X}_M$, $\overline{Y}_M$, and $\overline{Z}_M$ indicated at the color measuring means coincide with the previously identified standardized color values $\overline{X}_D$, $\overline{Y}_D$, and $\overline{Z}_D$ of the print corner colors. The color value triads required therefor are measured and stored as described.

Figure 3:
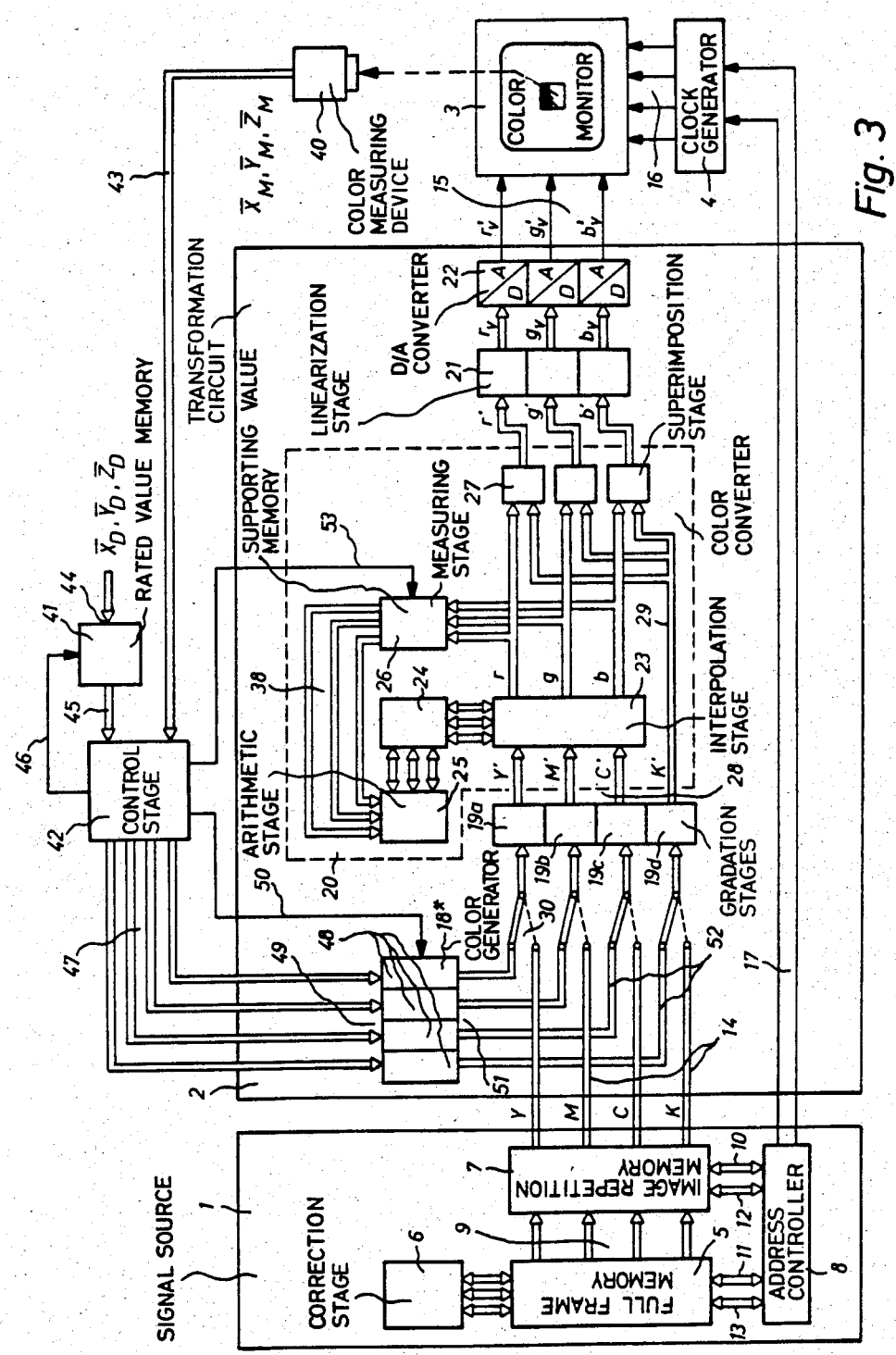
FIG. 3 is an advantageous development of a circuit arrangement of the invention.

In a preferred embodiment of the circuit arrangement which is shown in FIG. 3, the matching of the monitor corner colors to the print corner colors is automatically executed, so that the manual actuation of the color regulators 31 and the purely visual color comparison or readings of a color measuring means are eliminated in an advantageous fashion.

The color values r, g, and b required for the representation of the monitor corner colors can also be calculated from the standardized color values of the print corner colors $\overline{X}HD D$, $\overline{Y}_D$, and $\overline{Z}_D$ and the known standardized color values of the individual phosphors of the color monitor 3 for maximum picture white $(\overline{X}_R,\overline{Y}_R,\overline{Z}_R)$, $(\overline{X}_G,\overline{Y}_G,\overline{Z}_G)$ and $(\overline{X}_B,\overline{Y}_B,\overline{Z}_B)$ according to equations (5), wherein a completed monitor linearization is assumed:

$$\begin{bmatrix} \overline{X}_D \\ \overline{Y}_D \\ \overline{Z}_D \end{bmatrix} = \begin{bmatrix} \overline{X}_M \\ \overline{Y}_M \\ \overline{Z}_M \end{bmatrix} = \begin{bmatrix} r \\ g \\ b \end{bmatrix} \cdot \begin{bmatrix} \overline{X}_R & \overline{X}_G & \overline{X}_B \\ \overline{Y}_R & \overline{Y}_G & \overline{Y}_B \\ \overline{Z}_R & \overline{Z}_G & \overline{Z}_B \end{bmatrix} \quad (5)$$

After the measuring operation, the calculation of the color value triads $r_n$, $g_n$, and $b_n$ occurs in accordance with the second sub-step for the intermediate colors dependent on that type of printing (rotogravure, offset) that is supposed to be simulated on the color monitor.

The identification of the color value triads $r_n$, $g_n$, and $b_n$ for the intermediate colors shall be explained with reference to the example for an offset printing simulation. In this case, the color value triads are found by solving the known Neugebauer equations.

In autotype trichromatic printing, the eight corner colors of the print color space which are defined by standardized color values $\overline{X}$, $\overline{Y}$, and $\overline{Z}$, arise by side-by-side and partial superimposed printing of raster points of the printing inks yellow, magenta, and cyan. The primary colors yellow $(\overline{X}_y,\overline{Y}_y,\overline{Z}_y)$, magenta $(\overline{X}_m,\overline{Y}_m,\overline{Z}_m)$, and cyan $(\overline{X}_c,\overline{Y}_c,\overline{Z}_c)$ arise by side-by-side printing of raster points of the printing inks; the secondary colors red $(\overline{X}_r,\overline{Y}_r,\overline{Z}_r)$, green $(\overline{X}_g,\overline{Y}_g,\overline{Z}_g)$ and blue $(\overline{X}_b,\overline{Y}_b,\overline{Z}_b)$ arise by partial overlap of raster points of two printing inks; and black $(\overline{X}_s,\overline{Y}_s,\overline{Z}_s)$ arises by superimposed printing of raster points of all three printing inks, with white $(\overline{X}_w,\overline{Y}_w,\overline{Z}_w)$ arising in case no raster points are printed.

According to Neugebauer, the standardized color values $\overline{X}$, $\overline{Y}$, and $\overline{Z}$ of an intermediate color arise according to equation (6) by addition of the standardized color values of the corner colors, whereby the standardized color values of the corner colors are effective in accordance with the probable or statistical area proportions $\phi$ of the corner colors:

$$\begin{bmatrix} \overline{X}_D \\ \overline{Y}_D \\ \overline{Z}_D \end{bmatrix} = \phi_w \begin{bmatrix} \overline{X}_w \\ \overline{Y}_w \\ \overline{Z}_w \end{bmatrix} + \phi_y \begin{bmatrix} \overline{X}_y \\ \overline{Y}_y \\ \overline{Z}_y \end{bmatrix} + \quad (6)$$

$$\phi_m \begin{bmatrix} \overline{X}_m \\ \overline{Y}_m \\ \overline{Z}_m \end{bmatrix} + \phi_c \begin{bmatrix} \overline{X}_c \\ \overline{Y}_c \\ \overline{Z}_c \end{bmatrix} + \phi_r \begin{bmatrix} \overline{X}_r \\ \overline{Y}_r \\ \overline{Z}_r \end{bmatrix} +$$

$$\phi_g \begin{bmatrix} \overline{X}_g \\ \overline{Y}_g \\ \overline{Z}_g \end{bmatrix} + \phi_b \begin{bmatrix} \overline{X}_b \\ \overline{Y}_b \\ \overline{Z}_b \end{bmatrix} + \phi_s \begin{bmatrix} \overline{X}_s \\ \overline{Y}_s \\ \overline{Z}_s \end{bmatrix} .$$

The probable area proportions $\phi$ of the eight corner colors are dependent in the following fashion on the respective raster point sizes (%) or area coverage values, i.e. dependent on the color separation values M, and C of the resulting color:

| | | |
|---|---|---|
| $\phi_w = (1 - C) \cdot (1 - M) \cdot (1 - Y)$ | (White) | (7) |
| $\phi_y = Y \cdot (1 - M) \cdot (1 - C)$ | (Yellow) | |
| $\phi_m = M \cdot (1 - Y) \cdot (1 - C)$ | (Magenta) | |
| $\phi_c = C \cdot (1 - Y) \cdot (1 - M)$ | (Cyan) | |
| $\phi_r = M \cdot Y \cdot (1 - C)$ | (Red) | |
| $\phi_g = C \cdot Y \cdot (1 - M)$ | (Green) | |
| $\phi_b = C \cdot M \cdot (1 - Y)$ | (Blue) | |
| $\phi_s = Y \cdot C \cdot M$ | (3-color black) | |

According to equations (6) and (7), thus the standardized color values $\overline{X}_D$, $\overline{Y}_D$, and $\overline{Z}_D$ of the print intermediate colors can be calculated from the color separation values Y, M, and C of the print intermediate colors and the measured standardized color values of the print corner colors.

On the other hand, the standardized color values $\overline{X}_M$, $\overline{Y}_M$, and $\overline{Z}_M$ of the monitor intermediate colors can be defined according to equation (5) by the color values r, g, and b as well as by the known standardized color values of the individual phosphors.

The color values $r_n$, $g_n$, and $b_n$ required for the color coincidence between print intermediate colors and monior intermediate colors $(\overline{X}_D=\overline{X}_M, \overline{Y}_D=\overline{Y}_M, \overline{Z}_D=\overline{Z}_M)$ can be calculated from equation (5) in the arithmetic stage 25 and can be written over into the supporting value memory 24.

In case the standardized color values of the print corner colors are not present, they could be calculated in accordance with equation (5) from the known standardized color values of the individual phosphors and the stored color values r, g, and b for the monitor corner colors. The standardized color values of the print intermediate colors can then be determined with the calculated standardized color values with equations (6) and (7).

After the supporting value memory 24 has been filled, a check of the memory filling preferably occurs since triads Y, M, and C of color separation values of intermediate colors of the print color space are input into the color converter 20 with the color generator 18. The allocated color value triads r, g, and b are then calculated in the interpolation stage 23 with the assistance of the supporting values deposited in the supporting value memory 24. Finally they are converted into video drive signals $r_v$, $g_v$, and $b_v$. In order to simplify the check, for example, the triads Y, M, and C of color separation values for various characteristic intermediate colors of the print color space are stored in callable fashion in the color generator 18.

If it turns out in the check of the intermediate colors that one of the intermediate colors is to be modified, a partial correction of the memory filling is executed with the assistance of the arithmetic stage 25. This partial correction advantageously occurs in accordance with the European Letters Patent No. 0004078, corresponding to U.S. Pat. No. 4,328,515, incorporated herein by reference. For this purpose, the color value triads of the intermediate color to be maximally corrected are first modified in the desired sense and, subsequently, all color value triads within a three-dimensional correction region around the intermediate color to be maximally corrected are re-corrected in such fashion that a gradual correction progression between the modified color value triads of the corresponding intermediate color and the color value triads at the edge of the correction region is achieved.

FIG. 3 shows a preferred improvement of the circuit arrangement shown in FIG. 1 comprising a device for automatic matching of the monitor colors generated at the color monitor 3 to the corner colors of the print color space, also referred to as print corner colors. This additional device is composed of a color measuring means 40, of a rated value memory 41, of a control stage 42, and of a color generator 18* that has been modified in comparison to FIG. 1.

The color measuring device 40, for example model TMF 1 of the Thoma Co., is directed to the picture screen of the color monitor such that it acquires the eight monitor colors successively represented as color fields on the picture screen during the adjustment operation and defines their standardized color value triads $\overline{X}_M, \overline{Y}_M$, and $\overline{Z}_M$ as actual value triads of the monitor colors. The standardized color value triads $\overline{X}_M, \overline{Y}_M$, and $\overline{Z}_M$ of the monitor colors are continuously serially forwarded via a data bus 43 to the control stage 42 and are stored there.

Serving as rated value triads for the automatic matching are, for example, the standardized color value triads $\overline{X}_D, \overline{Y}_D$, and $\overline{Z}_D$ of the print corner colors measured in a color chart or values derived therefrom. The eight print corner colors are written via a data input 44 into the rated value memory 41 and are called in as needed by the control stage 42 via a data bus 45 with the assistance of a read clock on a line 46.

Dependent on the rated value/actual value comparison, the control stage 42 generates three variable color signal values for "yellow", "magenta", and "cyan" as well as a constant color signal value for "black" which was already explained in FIG. 1. Which individual phosphors of the color monitor 3 are to be varied in luminance as well as the amount and direction of the luminance modification are defined by the color signal values for "yellow", "magenta", and "cyan". The Table compiled on page 15 thus applies by analogy. The color signal values are supplied via data busses 47 to the modified color generator 18*. Instead of the color regulators 31, the modified color generator 18* contains four memory registers 48 into which the color signal values coming from the control stage 42 are written via data inputs 49 with the assistance of a write clock on a line 50 generated in the control stage. The data outputs 51 of the memory registers 48 are connectable via the data busses 52 and the switches 30 to the gradation stages 19a–19d and, thus to the color monitor 3 as well. As already described for the manual adjustment with the assistance of the color regulators, the matching of a monitor color to a print corner color is iteratively executed in successive cycles. Accordingly, one cycle comprises a color measurement, a rated value/actual value comparison, and alteration of the color signal values on the basis of the comparison. The following cycle again begins with a color measurement. The cycles are executed until coincidence between rated value triad and actual value triad for a monitor color, or an allowed slight deviation is identified. The control stage 42 then forwards a measure instruction via a line 53 to the measuring stage 26 which then measures the color value triad r, g, and b required for the representation of the matched monitor color. The matching operation for a new monitor color then begins, for which purpose the control stage 42 calls in the corresponding, new rated value triad from the rated value memory 41. The automatic sequencing operation is concluded when all eight monitor corner colors have been matched to the print corner colors. This can, for example, be indicated to the operator. Of course the operator can arbitrarily interrupt the operation or repeat it for a specific monitor color.

Various circuits previously described will now be discussed in greater detail.

In FIG. 1, full frame memory 5 for storing color separation values of a color picture image repetition memory 7 for generating a still picture on a monitor, and address controller 8 are known from U.S. Pat. No. 4,393,399, incorporated herein by reference. The full frame memory is referenced "1" therein, the image repetition memory "7", and the address controller "8". The address controller "8" is also shown in detail in FIG. 11 of U.S. Pat. No. 4,393,399.

The correction stage 6 of the present application can be constructed in accordance with U.S. Pat. No. 3,885,244 or in accordance with U.S. Pat. No. 4,285,009 (FIG. 3), both incorporated herein by reference.

The color generator 18 is composed, for example, of a voltage source, traditional potentiometers (color regulators 31), and analog-to-digital converters. Variable subvoltages which are converted into data in the analog-to-digital converters, and are output via the busses 14, are generated with the assistance of the potentiometers as voltage dividers. The gradation stages 19a–19d and the linearization stages 21 are, for example, programmable read-only memories (PROM) which are loaded with the data calculated according to a gradation curve or a linearization curve. This is a standard technique which, for example, is known from U.S. Pat. No. 4,075,662, incorporated herein by reference, for film linearization, i.e. for the compensation of the non-linearities of a film. This known technique is applied in analogous fashion in the present application for the compensation of non-linearities of a color monitor. As previously mentioned, the color converter 20 can be an allocator memory which is addressed by the values Y', M', and C' and which outputs not the values Y', M', and C', but the values r, g, and b that were previously allocated to them.

In the illustrative embodiment shown, the allocator memory is replaced by a smaller supporting value memory 24 and by an interpolator stage 23. This is standard technology for saving memory space. This technology is known, for example, from U.S. Pat. No. 4,075,662 (FIG. 3), incorporated herein by reference, in which the combination of supporting value memory "160" and interpolator stage "161" is disclosed.

The arithmetic unit 25 is, for example, a microprocessor which only has the task of depositing the data measured in the measuring unit 26 under the right addresses of the supporting value memory 24. The addressing of the supporting value memory has been previously described. The measuring unit 26 is a traditional digital measuring unit.

Although various minor changes and modifications might be proposed by those skilled in the art, it will be understood that we wish to include within the claims of the patent warranted hereon all such changes and modifications as reasonably come within our contribution to the art.

We claim as our invention:

1. An arrangement for isochromatic simulation of a multi-colored reproduction on a color monitor, comprising:
   (a) signal source means for outputting color separation values Y,M,C,K of a multi-colored reproduction;
   (b) transformer stage means connected to said signal source means for transformation of said color separation values Y,M,C,K into color monitor video drive values required for the isochromatic simulation;
   (c) a color monitor means connected to receive said video drive values;
   (d) said transformer stage means comprising
      (i) gradation stage means connected to said signal source means for changing the color separation values Y,M,C,K output by said signal source means according to a reproduction gradation curve dependent on the later to occur reproduction process;
      (ii) an arithmetic stage means for calculation of color value triads r,g,b for a supporting point network of a reproduction color space;
      (iii) a supporting value memory means connected to said arithmetic stage means for deposit of the calculated color value triads of the supporting point network;
      (iv) an interpolation stage means communicating with said gradation stage means, arithmetic stage means, and supporting value memory means for interpolation of color value triads r,g,b from color value triads $r_n, b_n, g_n$ of said supporting point network dependent on altered color separation values Y', M', C' of the three chromatic color separations of the multi-colored reproduction;
      (v) logic stage means communicating with said interpolation stage means and gradation stage means for formation of corrected color value triads r', g', b' from the color value triads r,g,b and from color separation values K' of a black separation;
      (vi) linearization stage means connected to said logic stage means for generating linearized color value triads $r_v, g_v, b_v$ from the color value triads r,g,b according to the radiation density characteristics of the color monitor means; and
      (vii) analog-to-digital converter means communicating with the linearization stage means for generating video drive values $r'_v, g'_v, b'_v$ from the linearized color value triads $r_v, g_v, b_v$.

2. An arrangement according to claim 1 wherein said logic stage means are designed as multipliers.

3. An arrangement according to claim 1 wherein a measuring stage means for color value triads r,g,b is provided, said measuring stage means being connected to outputs of said interpolation stage means and to said arithmetic stage means.

4. An arrangement according to claim 1 wherein an adjustable color generator means for prescription of color signal values is provided for generating colors on the color monitor means.

5. An arrangement according to claim 1 wherein following, additional circuit means are provided for automatic matching of the colors generated on the color monitor means to print corner colors, said circuit means comprising:
   (a) a color measuring means allocated to said color monitor means for measuring standardized color values of colors generated on said color monitor as actual values;
   (b) a rated value memory means for deposit of the standardized color values of the print corner colors as rated values;
   (c) a control stage means connected to said color measuring means and to said rated value memory means for generating color signal values dependent on a comparison of rated values and actual values; and
   (d) a modified color generator means comprising memory registers for color signal values which are connected to said control stage means and are connected to said gradation stage means.

6. A method for color equivalent simulation of a multicolor printing on a color monitor, wherein color separation values which represent colors of the multicolor printing to be printed on a print medium are converted into video drive values $r_v, g_v, b_v$ for the color monitor used to generate desired monitor colors which are color equivalents to the printed colors of the multicolor printing, comprising the steps of:
   (a) before the simulation;
      (i) linearizing non-linearities between radiation densities of the individual phosphors of the color monitor and nominal color values representing the desired monitor colors by determining for each triad of nominal color values, based upon said non-linearities, a corresponding triad of actual color values necessary to generate the desired monitor color;
      (ii) producing triads of color values r, g, b, converting said triads of the color values r, g, b into said video drive values $r_v, g_v, b_v$ and generating respective monitor colors on said color monitor;
      (iii) matching said generated monitor colors to corner colors of a print color space printed on the print medium by changing the triads of the color values r, g, b;
      (iv) measuring the triads of color values r, g, b obtained by the matching which are required for generating the monitor colors which are color equivalent to said corner colors of the print color space;

(v) calculating for intermediate colors lying between said corner colors of the print color space from triads of the color separation values Y, M, C for the three chromatic color separations of the corresponding intermediate color triads of color values r, g, b needed to generate monitor colors which are color equivalents to said intermediate colors and taking into consideration a type of printing method used in the later to occur printing process for said multicolor printing;

(vi) allocating to the triads of color separation values Y, M, C of the three chromatic color separations of the corner colors and intermediate colors of the print color space the corresponding measured and calculated triads of color values r, g, b to be converted into the color drive values instead of the allocated color separation values Y, M, C to generate monitor colors which are color equivalents to said corner and intermediate colors; and (b) during the simulation:

(i) calling up the color separation values Y, M, C of the three chromatic color separations and the color separation values K for black separation of the multicolor printing to be simulated on the color monitor;

(ii) modifying said color separation values Y, M, C of the multicolor printing according to a printing gradation used in the later to occur printing process for said multicolor printing;

(iii) outputting the previously allocated triads of color values r, g, b instead of the modified color separation values Y', M', C' of the three chromatic color separations of said multicolor printing;

(iv) combining said output triads of color values r, g, b and said modified color separation values K' of the black separation of the multicolor printing to obtain triads of corrected color values r', g', b'; and (v) converting said triads of corrected color values r', g', b' into said video drive values $r_v$, $g_v$, $b_v$ for controlling said color monitor.

7. A method according to claim 6 wherein the actual color values obtained in the linearizing step (a)(i) are taken into consideration in the allocating of color separation values Y, M, C, K and color values r, g, b in step (a)(vi).

8. A method according to claim 6 wherein the actual color values obtained in the linearizing step (a)(i) are taken into consideration in the converting of the corrected color values r', g', b' into said video drive values $r_v$, $g_v$, $b_v$ in step (b)(v).

9. A method according to claim 6 wherein for simulating a multicolor printing produced by offset printing, the calculating of color values r, g, b for intermediate colors in step (a)(v) is accomplished by the following steps:

(a) determining standard color values X, Y, Z for intermediate colors of the print color space according to Neugebauer equations by adding fractions of the standard color values X, Y, Z of eight printed corner colors of the print color space, whereby said fractions correspond to probable area portions of the corner colors of the print color space, and whereby said probable area portions depend on raster point sizes of color separation values Y, M, C of the printed intermediate colors; and (b) calculating the triads of color values r, g, b required for the color equivalent generation of the intermediate colors on the color monitor from said determined triads of standard color values X, Y, Z and the triads of standard color values of the individual phosphors of said color monitor.

10. A method according to claim 6 wherein the combining of color values r, g, b and said modified color separation values K' of the black separation in step (b)(iv) is carried out multiplicatively.

11. A method according to claim 6 wherein the allocating of triads of color separation values Y, M, C and triads of color values r, g, b in step (a) (vi) is accomplished prior to simulation of the multicolor printing for all theoretically possible colors of the print color space.

12. A method according to claim 6 wherein the allocating of triads of color separation values Y, M, C and triads of color values r, g, b in step (a)(vi) is accomplished in the following steps:

(a) undertaking the allocation prior to simulation of the multicolor printing for only a part of theoretically possible colors of a supporting reference point network of the print color space; and (b) obtaining by interpolation the triads of color values r, g, b corresponding to triads of called up color separation values Y, M, C of the multicolor printing during the simulation of the multicolor printing and outputting them.

13. A method according to claim 6 wherein the matching of monitor colors to the printed corner colors of the print color space in step (a)(iii) is accomplished by a visual comparison of the colors.

14. A method according to claim 6 wherein the matching of monitor colors to the printed corner colors of the print color space in step (a)(iii) is accomplished by comparison of color identification values of the colors measured in said colors.

15. A method according to claim 14 including the step of providing the color identification values as said standard color values.

16. A method according to claim 6 wherein the matching of the monitor colors to the printed corner of the print color space in step (a)(iii) is accomplished automatically by the following steps:

(a) employing values based on color identification values of the printed corner colors of the print color space as nominal values representing desired monitor colors;

(b) continuously measuring on the color monitor the values based on the color identification values of the monitor colors during the matching process; and (c) deriving the color values r, g, b necessary for generating monitor colors color-equivalent to said corner colors from a comparison of nominal values and actual values.

17. An apparatus for color equivalent simulation of a multicolor printing on a color monitor, wherein color separation values which represent colors of the multicolor printing to be printed on a print medium are converted into video drive values $r_v$, $b_v$, $b_v$ for the color monitor used to generate desired monitor colors which are color equivalents to the printed colors of the multicolor printing comprising:

(a) means for performing processing before the simulation, including:

(i) means for linearizing non-linearities between radiation densities of the individual phorphors of the color monitor and nominal color values representing the desired monitor colors by determining for each triad of nominal color values, based upon said non-linearities, a corresponding triad of actual color values necessary to generate the desired monitor color;

(ii) means for producing triads of color values r, g, b, converting said triads of the color values r, g, b into said video drive values $r_v$, $g_v$, $b_v$, and generating respective monitor colors on said color monitor;

(iii) means for matching said generated monitor colors to corner colors of a print color space printed on the print medium by changing the triads of the color values r, g, b;

(iv) means for measuring the triads of color values r, g, b obtained by the matching which are required for generating the monitor colors which are color equivalent to said corner colors of the print color space;

(v) means for calculating for intermediate colors lying between said corner colors of the print color space from triads of the color separation values Y, M, C for the three chromatic color separations of the corresponding intermediate colors triads of color values r, g, b needed to generate monitor colors which are color equivalents to said intermediate colors and taking into consideration a type of printing method used in the later to occur printing process for said multicolor printing;

(vi) means for allocating to the triads of color separation values Y, M, C of the three chromatic color separations of the corner colors and intermediate colors of the print color space the corresponding measured and calculated triads of color values r, g, b to be converted into the color drive values instead of the allocated color separation values Y, M, C to generate monitor colors which are color equivalents to said corner and intermediate colors; and (b) means for processing during the simulation, including:

(i) means for calling up the color separation values Y, M, C of the three chromatic color separations and the color separation values K for black separation of the multicolor printing to be simulated on the color monitor;

(ii) means for modifying said color separation values Y, M, C of the multicolor printing according to a printing gradation used in the later to occur printing process for said multicolor printing;

(iii) means for outputting the previously allocated triads of color values r, g, b instead of the modified color separation values Y', M', C' of the three chromatic color separations of said multicolor printing;

(iv) means for combining said output triads of color values r, g, b and said modified color separation values K' of the black separation of the multicolor printing to obtain triads of corrected color values r', g', b'; and (v) converting said triads of corrected color values r', g', b' into said video drive values $r_v$, $g_v$, $b_v$ for controlling said color monitor.

* * * * *